May 18, 1943.  A. C. KORTE  2,319,692
COMMUTATOR
Filed Aug. 3, 1942
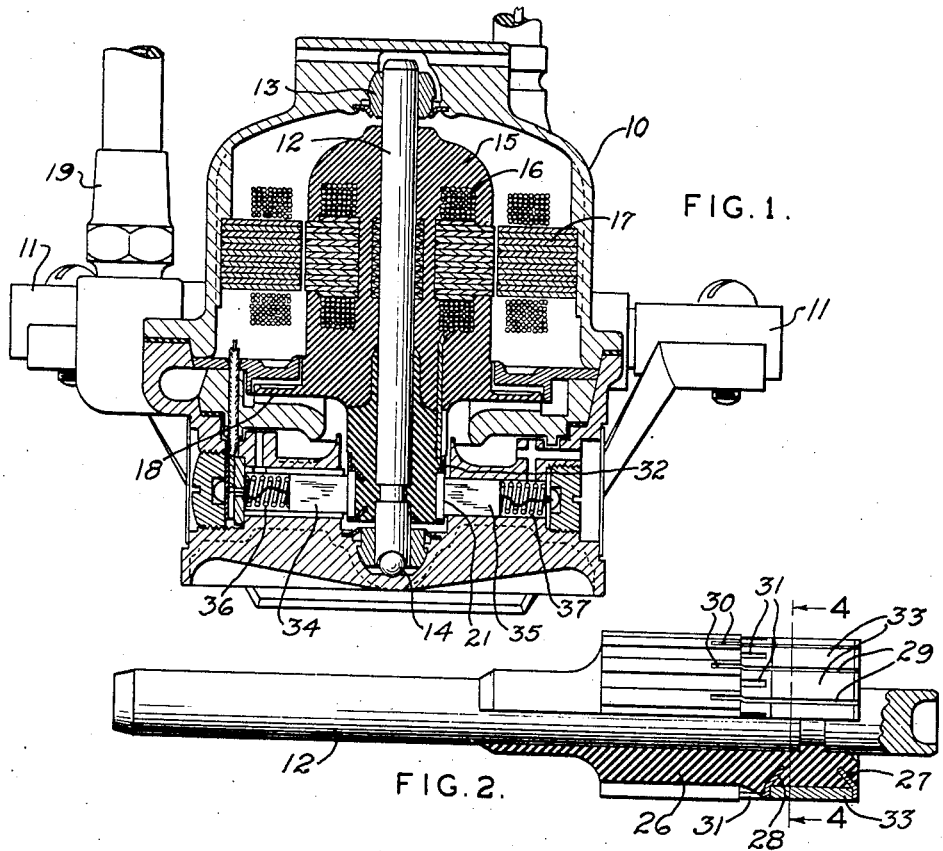
FIG. 1.
FIG. 2.
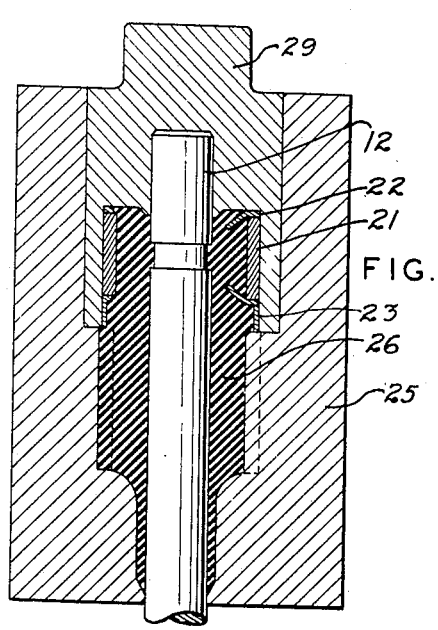
FIG. 5.
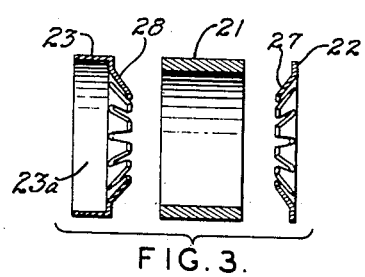
FIG. 3.
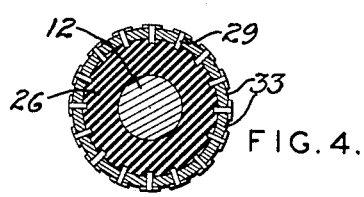
FIG. 4.
INVENTOR
ALFRED C. KORTE
Donald N. Rich
ATTORNEY Patented May 18, 1943

2,319,692

UNITED STATES PATENT OFFICE 2,319,692

COMMUTATOR

Alfred C. Korte, St. Louis, Mo., assignor to Carter Carburetor Corporation, St. Louis, Mo., a corporation of Delaware Application August 3, 1942, Serial No. 453,324

9 Claims. (Cl. 171—321)

This invention relates to commutators for electric motors and the method of constructing the same.

Commutators are preferably made of a material such as copper or silver which, though relatively soft, has good conducting qualities. Such commutators have been formed of a metal sleeve having inwardly projecting fingers for imbedding in the dielectric material which secured the brush race portion to the motor shaft. The ring is cut axially to form the commutating bars, each bar having an imbedding finger at each end. The dielectric material is usually pressed into the brush race ring and around the fingers and, accordingly, the fingers must be strong enough to withstand this pressure. Moreover, the fingers are usually punched in the edges of the metal sleeve and then bent over. Since the strength of the punch must conform to the hardness of the work, as the metal is made thicker, the space between these imbedding fingers must be made correspondingly wider to permit the use of a sufficiently rugged punch. In a small commutator, the number of bars which can be provided is thus limited by both the strength and thickness of the metal.

There have been suggestions as to special formation or treatment of the brush race portion of the commutator, but, as far as applicant is aware, there has been no practical suggestion for increasing the number of imbedding fingers and commutating bars without undesirably weakening the fingers and reducing the thickness of the brush race.

There are advantages to providing more and thicker commutating bars, than can be formed in a small commutator by the known method, as described above, and it is an object of the present invention to provide a commutator in which the brush race portion can be made relatively thick and durable and provided with substantially more commutator bars than has been practical heretofore.

Another object is to cheapen the construction of the commutator without weakening it or reducing its conductivity or wearing qualities.

Another object is to provide a method of forming small commutators, in particular, having a relatively large number of segmented bars, say 14 or more, while providing for a sufficiently durable brush race portion and rugged imbedding fingers.

These and other more detailed objects hereafter appearing are attained by the structure and method disclosed in the accompanying specification and in the drawing in which:

Fig. 1 is a view of an electrically operated pump embodying the invention.

Fig. 2 is an enlarged view of the motor shaft and commutator, a portion being sectioned.

Fig. 3 is a disassembled view showing the metal portions of the commutator before slotting.

Fig. 4 is a transverse section taken on the line 4—4 of Fig. 2 and

Fig. 5 is a view showing the method of assembling the motor shaft and commutator with bonding dielectric material.

The motor and pump shown in Fig. 1 comprise a casing 10 having supporting brackets 11 and receiving a motor shaft 12 in suitable bearings 13 and 14. Armature 15 comprises insulating material bonding winding 16 to shaft 12 and rotates in the usual manner between field pieces 17. A centrifugal pump impeller 18 is formed on the lower portion of armature 15 and, during operation of the motor, forces liquid outwardly through a tube connection 19. The entire unit is intended to be submerged in the gasoline tank of an automotive vehicle and fuel normally enters the lower portion of the casing to keep the impeller submerged therein. This electric pump is more fully disclosed and claimed in Patent No. 2,260,946, in the name of Korte et al. and in certain divisional applications thereof, two having resulted in Patents No. 2,261,915 and No. 2,271,560.

The commutator structure, to which this application is particularly directed, is formed on the lower part of motor shaft 12 below armature 15. As shown in Fig. 3, the metal parts of the commutator originally consist of three separately formed elements, a central, relatively thick ring 21 forming a brush race portion, and thinner end pieces 22 and 23. Ring 21 is formed of a good conducting material, such as copper or silver which, though soft, is made thick enough to last a long time in the intended service. Separate end pieces 22 and 23 are of brass or steel or other less expensive and harder, thinner material, and are separately formed by punching operations and then secured to the central ring, as by brazing or welding. Thereafter, the commutator may be assembled with the motor shaft in the manner disclosed in Apple Patent No. 1,578,793 by placing the metallic parts in a press 25 (Fig. 5) and pressing plastic, dielectric material 26 around imbedding fingers 27 and 28 and within ring 21. Considerable distorting pressure is applied to the fingers by plunger 29 during this operation, but these may be made sufficiently rigid to withstand the pressure.

After the brush sleeve and imbedding fingers are bonded to the motor shaft, longitudinal grooves 29 are cut through the metal parts and extend into the dielectric part, as at 30, to form the commutator bars 33. The collar portion 23a of left hand end piece 23 is provided with additional cuts 31 for the attachment of armature wires, as at 32 in Fig. 1.

In an actual embodiment of the electric pump device, as shown in Fig. 1, the commutator is made only slightly more than ½ inch in diameter and yet, by forming the commutator in the above described manner, ring 21 and end pieces 22 and 23 may be cut into as many as 14 bars, each having one each of the inwardly projecting fingers 27 and 28 thereon. The use of separately formed end pieces of relatively thin, hard metal greatly facilitates the punching of the imbedding fingers and, moreover, the end pieces being of more common metal than the brush race portion 21, decrease the cost of the commutator.

During operation, commutator bars 33, forming the brush race portion, rotate in contact with the usual brushes 34 and 35 constantly urged against the commutator by coiled springs 36 and 37, but the brush race may be made thick enough to last a long time.

Various departures may be made in the device as disclosed as will occur to those skilled in the art and the exclusive use of all modifications as come within the scope of the appended claims is contemplated.

I claim:

1. A commutator comprising an annular brush engaging portion of metal having relatively high conductivity, separately formed pieces of harder material secured to the edges of said annular portion and extending inwardly therefrom, and supporting body structure of insulating material closely fitting the interior of said annular portion and secured therein by said pieces.

2. A commutator comprising a segmental ring of material of high conductivity, but relatively soft, forming a brush race, end pieces of harder material secured to the edges of said ring and extending inwardly therefrom, and body structure of dielectric material secured within said ring by said pieces.

3. A commutator comprising a segmental ring of relatively soft material of suitable conductivity forming a brush race, separately formed end pieces of harder material secured to the edges of said ring, and having inwardly projecting fingers, and supporting structure of dielectric material formed within said ring and around said fingers, said fingers maintaining the assembly.

4. A commutator comprising a segmental brush race portion of a relatively rare metal having high conductivity, end pieces of a more common metal secured to the edges of said race portion, and supporting structure of dielectric material closely fitting within said portion, said end pieces having inwardly projecting fingers imbedded in said dielectric material for maintaining the assembly.

5. A commutator comprising a segmental brush race portion formed of silver, end pieces of more common metal secured to the edges of said race portion, and supporting structure of dielectric material closely fitting within said race portion, said end pieces having inwardly projecting fingers imbedded in said dielectric material to maintain the assembly.

6. A commutator comprising a conducting brush race portion of relatively thick material, end structure of substantially thinner material secured to one edge of said race portion and including a plurality of inwardly projecting fingers, and dielectric material formed around said fingers and within said race portion.

7. A commutator comprising a brush race portion of relatively soft, thick material, end structure of thinner, harder material secured to an edge of said race portion and including a multiplicity of inwardly projecting fingers, said race portion, and end structure being segmented to form bars each having one of said fingers projecting therefrom, and dielectric structure formed around said fingers and within said ring.

8. A commutator comprising a segmental brush race ring of relatively thick material, end structure of substantially thinner material secured to each edge of said ring and having segments in conformance with said ring, each of said last segments including an inwardly projecting finger, and di-electric material formed around said fingers and within said ring.

9. A commutator comprising a segmental ring forming a brush race portion, a portion formed of dielectric material for bonding said race portion to a motor shaft, and separately formed end piece secured to said race portion and imbedded in said material for strengthening the bond between said portions.

ALFRED C. KORTE.